United States Patent
Ivanova et al.

(10) Patent No.: US 11,443,011 B2
(45) Date of Patent: Sep. 13, 2022

(54) PAGE OBJECTS LIBRARY

(71) Applicant: salesforce.com, inc., San Francisco, CA (US)

(72) Inventors: Elizaveta Ivanova, San Francisco, CA (US); Manpreet Saini, Union City, CA (US); Tanay Ponkshe, San Francisco, CA (US); Gurvinder Singh, Redmond, WA (US)

(73) Assignee: Salesforce, Inc., San Francisco, CA (US)

( * ) Notice: Subject to any disclaimer, the term of this patent is extended or adjusted under 35 U.S.C. 154(b) by 52 days.

(21) Appl. No.: 16/218,645

(22) Filed: Dec. 13, 2018

(65) Prior Publication Data
US 2020/0192967 A1 Jun. 18, 2020

(51) Int. Cl.
*G06F 16/11* (2019.01)
*G06F 16/958* (2019.01)
*G06F 11/34* (2006.01)
*G06F 40/117* (2020.01)

(52) U.S. Cl.
CPC ........ *G06F 16/986* (2019.01); *G06F 11/3414* (2013.01); *G06F 16/11* (2019.01); *G06F 16/972* (2019.01); *G06F 40/117* (2020.01)

(58) Field of Classification Search
CPC ...... G06F 16/986; G06F 16/972; G06F 16/11; G06F 40/117; G06F 11/3414
USPC ........................................................ 715/234
See application file for complete search history.

(56) References Cited

U.S. PATENT DOCUMENTS

| | | | | |
|---|---|---|---|---|
| 6,973,625 B1* | 12/2005 | Lupo | .................. | G06F 8/38 |
| | | | | 715/744 |
| 2003/0115548 A1* | 6/2003 | Melgar | .................... | G06F 8/30 |
| | | | | 715/234 |
| 2003/0225781 A1* | 12/2003 | Kusterer | ............ | G06F 16/9027 |
| 2005/0015512 A1* | 1/2005 | Kale | .................. | G06F 16/9566 |
| | | | | 707/E17.115 |
| 2009/0210781 A1* | 8/2009 | Hagerott | ................. | G06F 9/451 |
| | | | | 715/234 |
| 2012/0030514 A1* | 2/2012 | Lawrance | ........... | G06F 11/3672 |
| | | | | 714/38.1 |
| 2012/0102471 A1* | 4/2012 | Artzi | ......................... | G06F 8/30 |
| | | | | 717/133 |
| 2012/0246515 A1* | 9/2012 | Lusenhop | ........... | G06F 11/3672 |
| | | | | 714/32 |
| 2014/0053166 A1* | 2/2014 | Moore | .................... | H04L 67/42 |
| | | | | 719/316 |
| 2014/0173582 A1* | 6/2014 | Hofhansl | ................. | G06F 8/71 |
| | | | | 717/170 |

(Continued)

*Primary Examiner* — Hope C Sheffield
(74) *Attorney, Agent, or Firm* — Holland & Hart LLP

(57) ABSTRACT

A system may include an application server and a user device. The application server may host an application customized for the user device. Tests may be designed to check the functionality of the application at the user device. The application and test may be designed using a page objects library which improve durability of the application and tests to changes made to the application. Thus, even if changes are made to the application, the test which check the functionality of the application may not break if the application and the tests are created based on the page objects library. The application sever may generate the page objects library and distribute the page objects library to its tenants.

20 Claims, 10 Drawing Sheets

(56) References Cited

U.S. PATENT DOCUMENTS

| | | | |
|---|---|---|---|
| 2016/0124914 A1* | 5/2016 | Deng | G06F 9/451 |
| | | | 715/204 |
| 2017/0124124 A1* | 5/2017 | Gackiere | G06F 16/2282 |
| 2017/0331789 A1* | 11/2017 | Kumar | H04L 63/0281 |
| 2018/0025081 A1* | 1/2018 | Denninghoff | G06F 40/134 |
| | | | 707/711 |
| 2019/0079853 A1* | 3/2019 | Makkar | G06F 8/71 |

* cited by examiner

PAGE OBJECTS LIBRARY

FIELD OF TECHNOLOGY

The present disclosure relates generally to database systems and data processing, and more specifically to a page objects library.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

An application used at a user device may be hosted by a server (e.g., a server supported by the cloud platform). Any changes made to the application at the server side may affect performance at the user device. Techniques for reducing the impact to performance at the user device based on changes to the application can be improved.

DETAILED DESCRIPTION

Figure 1:
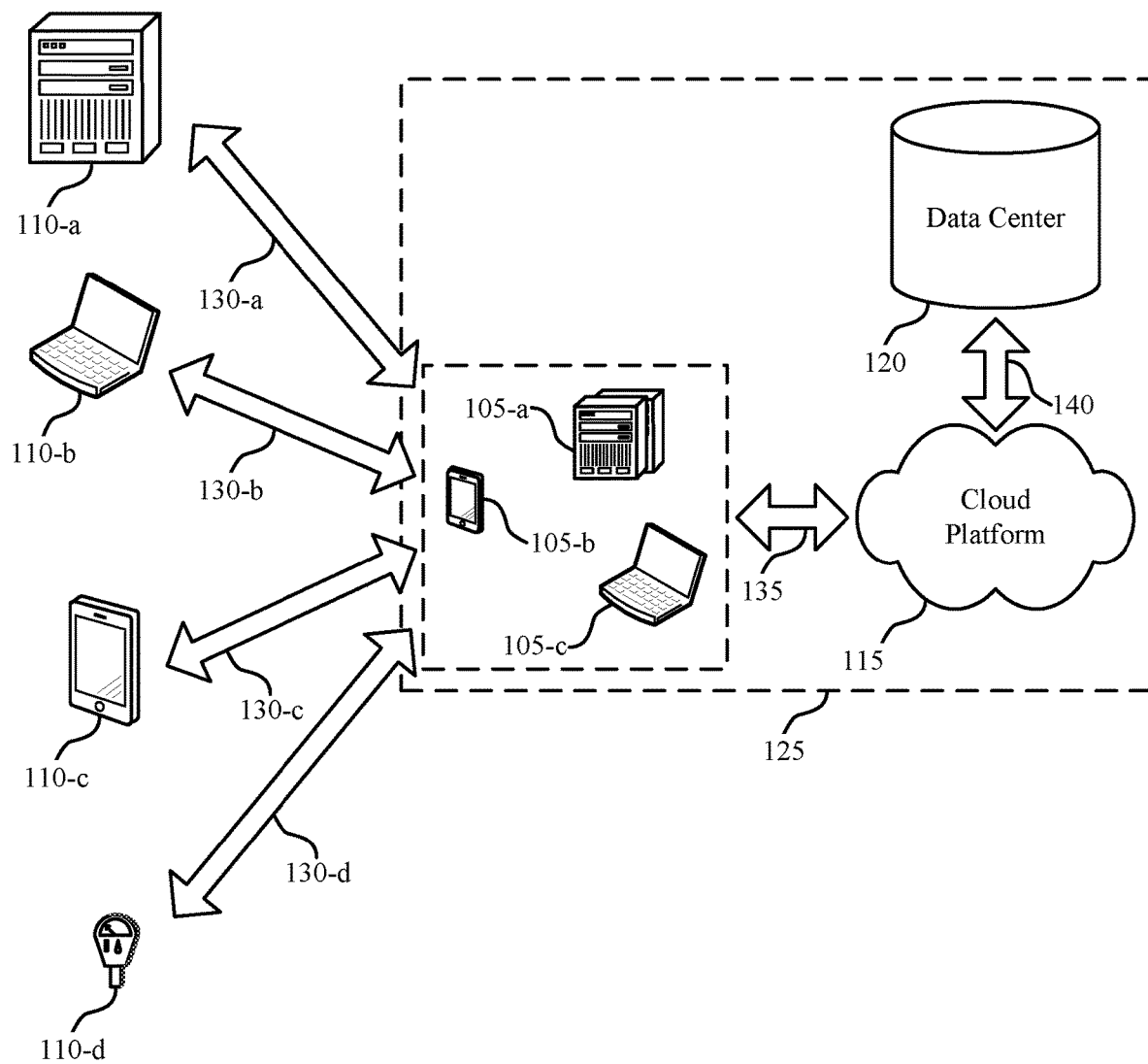
FIG. 1 illustrates an example of a system for maintaining automated tests that supports a page objects library in accordance with aspects of the present disclosure.

A system (e.g., a cloud-based system supporting customer relationship management (CRM) solutions) may support a number of applications, pages, or both for displaying components. An application server may host an application, and a tenant of the server may use an instance of the application which may be customized for the tenant. The application may include various components and pages, and the tenant or a contact of the tenant may navigate the pages and interact with the pages. In some cases, the tenant, or a non-server side developer, may create an automated test which checks the functionality of the application instance (e.g., an automated page functionality test). The automated test may check that the application instance, including its pages and components, is functional and working correctly. The automated test may be a script which, for example, inserts texts into text fields, clicks buttons on the page, selects values for various components of the page, etc.

In some cases, the application hosted by the application server may receive updates or changes. The changes made to the application may affect the instance of the application used by the tenant, even if the changes do not result in a visual difference for the application instance. In some cases, the changes may be based on back-end changes which are made at the application server, or the changes may be front-end changes such as customizations to the application made by the tenant. In some cases, these changes may affect the automated test which checks functionality of the application instance. For example, the application changes may change a locator for a component, which the automated test uses to find the component and check the functionality of the component. If the automated test uses a hardcoded locator to find the component, but the changes to the application break the link between the hardcoded locator and the component, the automated test may be unable to find the component. If the hardcoded locator cannot find the component, the automated test may be unable to check whether the component is working correctly, and the automated test may fail. This may lead to lower reliability for the application instance or downtime for the application instance while the tenant or a developer re-writes the automated test or modifies the application to account for the changes.

The application changes may be thoroughly tested at the application server prior to pushing the changes to the application instances. In some cases, how the changes affect the components of the application instance may be known based on tests performed at the application server or on server-side instances of the application. Observations of the differences between versions of the application may be used to generate a library of classes for page objects of the application. The library of classes may, in some cases, be referred to as a page objects library. The page objects library may provide modules that are agnostic to application user interface (UI) changes. Tests for a page of the application which are generated based on the page objects library may work correctly even after additional changes are made to the application. Further, an application which is customized based on the page objects library may be easily customized. Thus, different tenants for different organizations may easily customize their own applications based on the page objects library.

Modules of the page objects library may be agnostic to application UI changes based on using relative locators instead of hardcoded locators. When a change is made to the application, a hardcoded locator may improperly reference the component and be unable to locate the component. However, a relative locator may be robust against changes to the application. The UI components on a page may be reusable, where a same default locator is used for the UI components across multiple pages of the application. If the relative locator for the UI component changes, there may be a single point of change based on using the default locator for the multiple versions of the component. The relative locators may locate a UI component relative to its parent or containing components. The relative locator may start from a root element of the page and traverse a component hierarchy until the relative locator finds the UI component. The relative locators may be stored in property files to easily support multiple implementations for a page object. The page objects library may support one class having multiple property files, where each property file may be used for a different situation or implementation. When the automated test executes, or at runtime of the application, the different versions of the UI component may have an associated property file hooked in to use the correct relative locator for each of the different versions of the UI component.

The page objects library may include a page objects API based on the UI of the application instance. The API for the page objects library may provide additional functionality, such as handling objects in the shadow document object model (DOM), using multiple property files to provide multiple locators for different version of a UI component, and generation of a record form page object from an extensible markup language (XML) file. Thus, the page objects library may provide robustness for scripts and tests which use an application, even if changes, including back-end changes, are made to the application. The page object library may also reduce a number of different page object classes by using multiple property files for a single page object class, which may reduce overhead.

Aspects of the disclosure are initially described in the context of an environment supporting an on-demand database service. Aspects of the disclosure are further illustrated by and described with reference to apparatus diagrams, configuration examples, system diagrams, and flowcharts that relate to a page objects library.

FIG. 1 illustrates an example of a system 100 for cloud computing that supports a page objects library in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The subsystem 125 may support a number of applications, pages, or both for displaying components related to CRM processes, data management, messaging, or any other supported functionality. These applications, pages, and components may be configurable by a user (e.g., an administrative user of an organization, a developer writing code to support back-end or front-end processes, etc.). For example, an administrative user may create and customize a page of an application or components of the page using an application builder (e.g., an application builder running on a cloud client 105).

In some cases, the administrative user, or a different developer, may create an automated test which checks the functionality of the application. The automated test may check that the application is functional and working correctly, for example by executing testing code which interacts with the components of the page and determines whether the components react appropriately based on the interactions. In some examples, the automated test may check whether a button of the page can be pressed or whether text can be inserted into a text field, though other situations or uses of the components and page may be tested as well. In some cases, the automated test may be performed (e.g., the scripts are executed) at a device of the cloud client 105.

In some cases, changes or updates may be made to the application. In some cases, the changes may be made by an application server, which may be hosted by the cloud platform 115. The changes made to the application may affect the application used by the tenant, even if the changes do not result in a visual difference to the UI of the application. In some examples, these changes may affect the automated test performed by the cloud client 105. For example, the application changes may change the page such that a locator to a component cannot correctly find the component. For example, the automated test may find a component on the page by using a hardcoded locator, which identifies the component in order to perform various actions on the component. If the changes to the application break a link between the hardcoded locator and the component, the automated test may fail. If the hardcoded locator cannot find the component, the automated test may be unable to check whether the component is working correctly. This may lead to lower reliability for the application or downtime for the application while the cloud client 105, or a developer for the cloud client 105, identifies the problem and rewrites the automated test to account for the changes. Other changes may break the automated tests as well, such as front-end customization of the application like changes made by the administrative user or a front-end developer.

Any changes to the application may be thoroughly tested at the cloud platform 115 (e.g., at the application server or via testing devices) prior to pushing the changes to the cloud clients 105. In some cases, how the changes affect the components of the application instance may be known based on the tests performed at the application server or on server-side instances of the application. Thus, the subsystem 125 may support generating a library of classes for page objects which can be used by the cloud client 105 to prevent or fix issues caused by changes to application. The library of classes may, in some cases, be referred to as a page objects library. The page objects library may provide modules that are agnostic to application UI changes. Tests generated based on the page objects library may work correctly even after changes are made to the application. The cloud platform 115 may provide the page objects library to the cloud clients 105 (e.g., via the network connections 135). In some cases, the page objects library in a Java archive (JAR) file, via a shared code repository, or using other techniques for distributing a library of classes. The cloud clients 105 may use the page objects library when designing automated tests, when designing an application or components of the application, or when creating or modifying a page object or elements of the page object.

In some cases, the modules may be agnostic to application UI changes based on using relative locators instead of hardcoded locators. When a change is made to the application, a hardcoded locator called in an automated test may improperly reference a UI component and be unable to locate the UI component. A relative locator as described herein may be robust against changes to the application and may not fail like the hardcoded locator. The UI components on a page may be reusable, where a same default locator is used for the different versions of a UI component across multiple pages. If the relative locator for the UI component changes, there may be a single point of change for each of the multiple UI components. This may consolidate any revisions made to the automated tests for the cloud client 105.

The class for the component may be configured to support multiple property files. Each property file may include a relative locator. Thus, the page object library may support one component (e.g., and one class for that component) being used for multiple different implementations. When an automated test executes, the different versions of the component may have an associated property file hooked in or loaded to use the correct relative locator for each of the different versions of the UI component.

The relative locators may be configured to locate a UI component on a page of the application relative to its parent or containing components. The relative locator may start from a root element of the page and traverse a component hierarchy until the relative locator finds the UI component. Thus, the page objects library may provide robustness for scripts and tests which use an application, even if changes, including back-end changes, are made to the application. The page object library may also reduce a number of different page object classes by using multiple property files for a single page object class, which may reduce overhead.

The page objects library may also include a page objects API based on the UI of the application instance. The API for the page objects library may provide additional functionality, such as handling objects in the shadow DOM, using multiple property files to provide multiple locators for different version of a UI component, and generation of some page objects from XML file. Therefore, the API for the page objects library may reduce complexity for creating a page object, reduce overhead for modifying automated tests by limiting the scope of the changes, and improve functionality by supporting shadow DOM handling.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example embodiment, a cloud client 105 may design an application using the application builder without the page objects library. Two pages of the application may use the same UI component. The cloud client 105 may create two instances of the UI component, one for each of the two pages. Each of the pages may create the UI component by using a hardcoded locator to the class of the UI component. For example, a first page may include a web element for a save button by using a first hardcoded locator to a button class, and the second page may include a web element for a cancel button by using a second hardcoded locator to the button class. If the cloud client 105 decides to instead use a different class (e.g., a different button) for the save button and the cancel button, the developer would have to update each call to the hardcoded locator for the first class to a call to the different class for the different button. If the application used by the cloud client 105 has many hardcoded locators to a class which is then changed, this may result in significant work for the cloud client 105 to identify each call for the first class and replace it with a call to the new class.

Additionally, if there are changes (e.g., back-end or front-end changes) to the class used for the save button and cancel button, the back-end changes may break the hardcoded locators such that they cannot find the save button and cancel button. For example, if backend changes are made to the application to provide support for a first organization, the changes made to the application may actually break some locators used by a second organization.

By using the page objects library, the save button and the cancel button of the application for the cloud client 105 described above may instead use a new class included in the page objects library. The class in the page objects library may use a default locator for the UI components which can be reused across page objects. For example, instead of declaring each of the buttons as elements of the WebElement class with hardcoded locators, the page objects library may provide a button class with a default locator. The default locator of the button class may load a property file based on the context of the button buttons. For example, the save button may hook to a property file associated with the save button, and the cancel button may hook to a property file associated with the cancel button. The property files may include the locators for the components. Through the relative locators in the property files, the components may be located relative to their closest ancestors, starting from the root (e.g., the top most container of the components) down to the buttons themselves based on a component hierarchy of the page. Therefore, the page objects library may support using a single class provided in the library for a component across multiple versions of the component.

Figure 2:
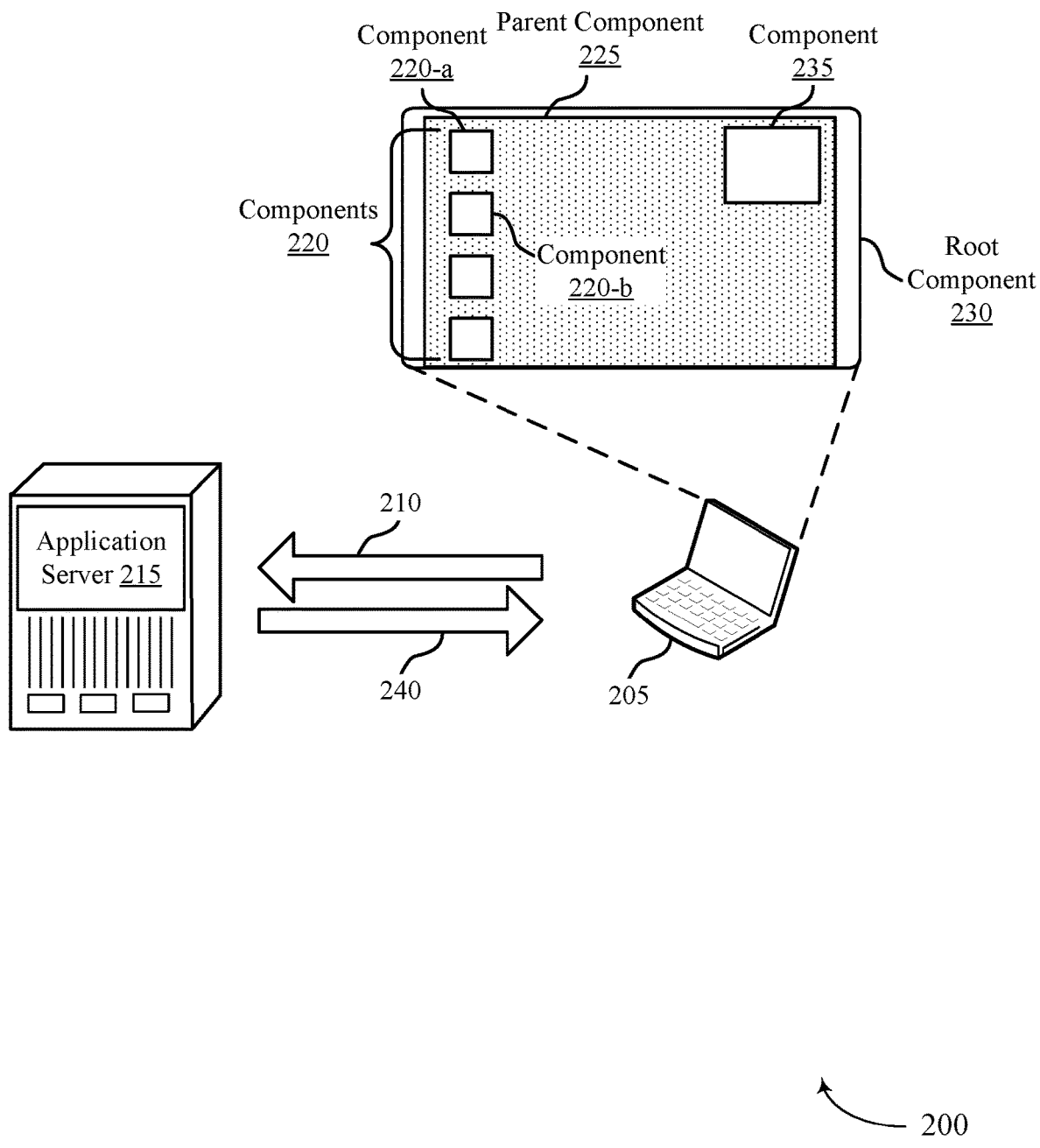
FIG. 2 illustrates an example of a system that supports a page objects library in accordance with aspects of the present disclosure.

FIG. 2 illustrates an example of a system 200 that supports a page objects library in accordance with aspects of the present disclosure. The system 200 may include one or more user devices 205, which may be examples of cloud clients 105 or contacts 110 as described with reference to FIG. 1. An administrative user may operate the user device 205 running an instance of an application which is hosted by an application server 215. In some cases, the user device 205 may run an application builder which builds the instance of the application or an application functionality testing program. Using the user device 205, the administrative user or another developer may create the application including one or more pages and components. The administrative user may use some default components to create the application or use their own custom components.

In some cases, the administrative user, or a developer, may create a test for the application. For example, the test may be an automated functionality test, such as a QA test, which checks if the application and the components of the application are working correctly. The automated test may execute a script which attempts to perform actions on one or more components of the application. For example, the automated test may locate a button on a page of the application and click the button. The automated test may look for the component in the corresponding page object of the application and by using a locator for the component.

As an example, a component on a page of the application may be a button. In the application builder, the button may be generated using a class of buttons that use hardcoded locators which explicitly point to the generated button. An automated test executed at the user device 205 may locate the button using the hardcoded locator and attempt to click on the button. If the button can be clicked, and the expected result of clicking the button occurs, the automated test may pass for the button. If the button cannot be found, the button cannot be clicked, or the expected outcome of clicking the button does not occur, the automated test may fail. If the test fails, the application may not be working correctly, and the administrative user may be unable to reliably use the application.

In some cases, the application may receive updates or changes. The changes may be front-end changes or back-end changes. An example of a front-end change may be the administrative user selecting a different class or type of component for the application. For example, instead of using a default button, the administrative user may select to use a custom button, which the administrative user or another developer may have created. An example of a back-end change may include changes made at the application server 215, which may affect the application hosted for the user device 205. For example, a component or a page of the application may be modified at the application server 215, which may affect the application at the user device 205.

Changes made to the application may affect the performance of an application functionality test, even if the changes do not result in a visual difference or affect the UI of the application. For example, if a locator for a component is changed, and the automated test tries to use an old or out of date locator to find and check the functionality of the component, then the automated test may not find the component. If the automated test cannot find the component, the automated test may fail. This may lead to lower reliability for the application or downtime for the application at the user device 205 while the automated test is rewritten (e.g., by a developer or by the administrative user) to account for the changes to the application.

The application changes may be thoroughly tested at the application server 215 prior to pushing the changes to the application instances at different user devices or cloud clients 205. In some cases, how the changes affect the components of the applications may be known based on tests performed at the application server 215 on server-side instances of the application. In some cases, testing data or testing results may be stored in a data center connected to the application server 215.

The system 200 may support generating a library of classes for page objects which can be used at the user device 205 to prevent or fix issues caused by changes to the application. The library of classes may be generated at the application server 215. The library of classes may, in some cases, be referred to as a page objects library. The page objects library may provide modules that are agnostic to application UI changes. Tests generated based on the page objects library may work correctly even after changes are made to the application. The page objects library may be shared with tenants (e.g., customers) of the application server 215. For example, the page objects library may be shared with the user device 205. The user device 205 may send a request 210 to the application server 215 for the page objects library. In some cases, the request 210 may be sent via a download request to receive a JAR. Additionally, or alternatively, the request 210 may be a request to a shared code repository (e.g., a git request). The application server 215 may provide the page objects library to the user device 205 in a response 240. In some other examples, the page objects library may be provided or distributed using other techniques for distributing a library of classes. The administrative user for the user device 205, or other developers, may use the page objects library when creating automated tests for the application, when designing an application or components of the application, or when creating or modifying a page object or elements of the page object.

The page objects library may provide an integration API for integrating the page objects library capabilities with existing frameworks. The page objects library may support shadow DOM. For example, the page objects library may restrict direct access to the WebDriver API, adding a new abstraction level. The page objects library may enforce better coding practices in page objects by providing a restricted API and setting limitations for locators. In some cases, the page objects library may reduce maintenance efforts by supporting FluentWait techniques in element actions and assertions.

A page object may include a place, a page object component (e.g., PageObjectComponent), a web component (e.g., WebComponent), or a form component (e.g., FormComponent). A place may represent a page that may be navigated to via a uniform resource locator (URL) in a browser. A page object component may be a page object that includes one or more other components (e.g., a container component). A web component may be a class that includes one component. A form component may be a page object that uses a Page Spec file to build locators in runtime. Page objects that have dependencies from application code may be declared as interfaces extending a page base API and may be packaged in a module together (e.g., ui-pageobjects-api). Some of the pages may have context parameters such as the type of object which is indicated by implementing a WithParameters interface to check that the parameter is actually provided at runtime.

Each page object may have different implementations based on application type or organization setup (e.g., associated with the corresponding user device 205). In some cases, a page object interface may be restricted from using methods that have dependencies on the page layout or environment. For example, a page object may have public methods for user actions such as "save," "clickAction," or "pickRecordType." The page object may have public action methods for landing a user to another page or loading other components. In some cases, the page object may have getter methods for returning internal components. In some cases, page objects may have getter methods allowing to access element state and properties for script assertions.

The page objects library may support reusable components which use a common default locator. Many different pages and forms in the application may use the same components and page elements. For example, multiple pages may use a common button. The page objects library may include a class for the common button, and the class for the common button may use a default locator. The common button class may then be reused across page objects. For example, a first page object may include a component 235. A second page object (not shown) may reuse the component 235. Both the first page object and the second page object may use the same default locator for the component 235. Thus, if a change is made to a locator for the component 235, the change may be made at one point (e.g., in the class of the component 235) instead of making a change to each page object that uses the component 235. Therefore, the application and UI components may be modified and customized for the user device 205 with minimal building and maintenance efforts. Without using the page objects library, if a component is replaced with a new component, all page objects using the old component would have to be updated to fix the locators.

In some cases, the modules may be agnostic to application UI changes based on using relative locators instead of hardcoded locators. When a change is made to the application, a hardcoded locator called in an automated test may improperly reference a component and be unable to locate the component. A relative locator as described herein may be robust against changes to the application and may not fail if changes are made to the application. In some cases, the relative locators may be examples of CSS locators. In some cases, the relative locators may not cross DOM hierarchy and may not have explicit access to sub-elements.

The relative locators may be configured to locate a component on a page of the application relative to its parent or containing components. Each element may be located inside its closest ancestor, starting from the root (e.g., the top-most container of the components) all the way to the element itself. The relative locator may traverse a component hierarchy until the relative locator finds the component. For example, a button "New" to create a new record may be located inside a "ForceAction" component, and the "ForceAction" component may be located inside a "ListViewManager" component, which may be inside an "ObjectHome" component. When an automated test clicks on the "New" button, the component may be located based on each of its containing components. For example:

ByCss:.forceObjectHomeDesktop//first find root—object home

ByCss:.forceListViewManager//then list view inside it

ByCss:.forceActionsContainer//then force actions panel inside list view

ByCss:a.forceActionLink[title='New'//and finally the button to click

The automated test just clicks the button 'New.' The automated test may not need to consider the hierarchy of components leading to the button.

Classes in the page objects library may be configured to support multiple property files. For example, each property file may be associated with a relative locator specific to the implementation of the property file. When an automated test executes, the different versions of the UI component may have an associated property file hooked in to use the correct relative locator for each of the different versions of the UI component. Thus, the page objects library may provide robustness for scripts and tests which use an application, even if changes, including back-end changes, are made to the application. The page object library may also reduce a number of different page object classes by using multiple property files for a single page object class, which may reduce overhead.

For example, a page of the application may be shown in the system 200. The page may include a root component 230, which may be an example of a base container component for the page. The page may also include a parent component 225, which may contain other components like components 220 or a component 235. In some cases, the components 220 may be of a first class and the component 235 may be of a second class. For example, the components 220 may be buttons generated from a button class included in the page objects library, and the component 235 may be an example of a text field component generated from a text field class included in the page objects library. In some cases, the components 220 and the component 235 may be different types of a same component class (e.g., a Page Element or Page Component class) included in the page objects library, where the different types of components are specified by arguments or annotations when calling the component class. For example, the page objects library may include a page element class which can be specified to be either a button or text field, or other type of component, based on how the class is called or the context of the generated page element.

In an example, the components 220 may be generated using a first class in the page objects library. Each of the components 220 may be a different instance of the same component. For example, component 220-a may be a first button to select a first option and component 220-b may be a second button to select a second option, etc. The components 220 may be generated using a same class from the page objects library, and the class for the components 220 may use the same default locator for each of the components 220. In some cases, the components 220 may be identified based on an index. If a page contains more than one component of a same type, the annotation for the components may include an index parameter. In some cases, the page object may include a locator for the number of elements on the page so that each element of the page can be located relatively to the parent. For example, component 220-a may correspond to a first index of the elements of the page, and component 220-b may correspond to a second index of the elements of the page. Therefore, when locating component 220-b, component 220-b may be located based on being the second element of the list of elements for the page. In some cases, the component 235 may correspond to, for example, a fifth index of elements of the page. In some other examples, the component 235 may be a first index for a different type of component than the components 220.

The components 220 and the component 235 may be located relative to the parent component 225 and the root component 230. For example, when component 220 is referenced, the locator may start by locating the root component 230, then locating the parent component 225 in the root component 230, then locating component 220-a in the parent component 225.

The reusable components (e.g., including the components 220 and the component 235) may hook different locators from properties files. The page objects library may support hooking different versions of the component in runtime without changing scripts the component is used in. For example, the page object library may use different property files with locators, which may keep existing page objects and scripts unchanged.

In an example, a page object may have two internal implementations for different frameworks (e.g., included in the page object library). These components may functionally provide the same features but use different locators. Additionally, a developer at the user device 205 may generate a custom implementation for the page object that may use a different stylesheet. In other systems, this may lead to three different page objects. However, by using the page objects library, the system 200 may support the different implementations using one page object with multiple different property files for each of the different implementations. The correct property file may be hooked in at runtime based on the context of the page object. Thus, the page objects library may keep one class with any number of property files, and the right property will be hooked in runtime depending on the context.

Page elements may be initialized with actual values including locators in runtime. At runtime of the application, the application may know which resources to bootstrap and if shadow DOM is enabled or not. A root locator may be added at the class level using an annotation (e.g., "@Root"), web elements may use a find annotation (e.g., "@Find"), and a parameter may be used to point to the property name. Components located inside a page object may not extend "locator," as the page object type may extend WebComponent. It may be unlikely for some page objects and element locators to be overridden, and these page objects and element locators may be hardcoded in the annotation. A locator may have a context-dependent parameter such as a label, then in runtime the parameter may be applied using a method to replace the context-dependent parameter. In some cases, an element may have an absolute locator, and the element may have a parameter set to enforce finding only self. In some cases, elements and components may differ based on locators. For example, elements may only have one locator.

In some cases, actions may be executed based on a FluentWait procedure. The FluentWait procedure may repeatedly try to locate elements and apply actions every second within a timeout. The default duration for the timeout may be, for example, 20 seconds, but the duration of the timeout may be configurable. FluentWait may operate in the background of the application at the user device 205. In some cases, FluentWait may be an example of a testing program or testing procedure which checks the functionality of the application. However, FluentWait may passively run in the background of the application. Thus, FluentWait may check changes to the application while a developer makes the changes. Thus, the page object developer or the administrative user of the user device 205 may not have to call wait methods explicitly. In some cases, FluentWait may eliminate stale element exceptions (e.g., StaleElementException). In some examples, FluentWait may repeatedly check for coding errors to ensure a higher coding quality for customized applications. FluentWait may implement actions such as click, entering text, and sending keys. In some cases, FluentWait may be customized to provide support for other functions to add custom behavior. For example, FluentWait may be customized to support clicking a button until the URL matches an expected value, among other examples of testing procedure for the application.

FluentWait may support conditional methods allowing to apply an action or function if a found element matches a certain condition. For example, FluentWait may be configured to only click on an element if the element contains certain text. FluentWait based assertions may be configured to find matching elements. Assertion failures may throw different exceptions (e.g., an assertion failure) than failures to execute a user action (e.g., a web driver exception), but the assertion failure may still interrupt the test and mark the test as failed.

In some cases, the page objects library may support features for the shadow DOM. When shadow DOM is enabled, in some cases, the relative locator mechanism may find a child element inside the shadow DOM. This may be supported for components and elements by including a parameter to the annotation (e.g., inShadow=true). In some cases, using a locator to identify a child element inside the shadow DOM may be disabled unless a system parameter is set (e.g., if -Dlp_shadow is set).

A page object that creates or edits an object record may be called a record form. Record forms may be build based on an XML file with a list of fields for a given record type. In some cases, the XML file may be referred to as a page spec. Fields and field types may be provided in the UI API. Instead of declaring all available elements in the form, the page objects library may build the elements in the form based on an XML file. The XML file may be located in a same folder as the page resources and include a list of fields with a name, type, and index, or any combination thereof.

When a form page object is instantiated, for each XML tag, the page objects library may build an instance of the component and put in a map with the name of the element as a key. When a form page object is instantiated, the XML file may become a map of key value pairs where the name is a key and the component is the value. In a test script, fields may be accessed by name.

Fields locators may be built in runtime, mapping between element type and XML tag name. In some cases, the mapping may be based on Java architecture for XML binding (JAXB) annotation. The field type may be found based on a mapping with XML tags. The page objects library may create an instance of the field based on the mapping and add it to the elements map using the name as a key. The page objects library may access elements from a test using a name.

Figure 3:
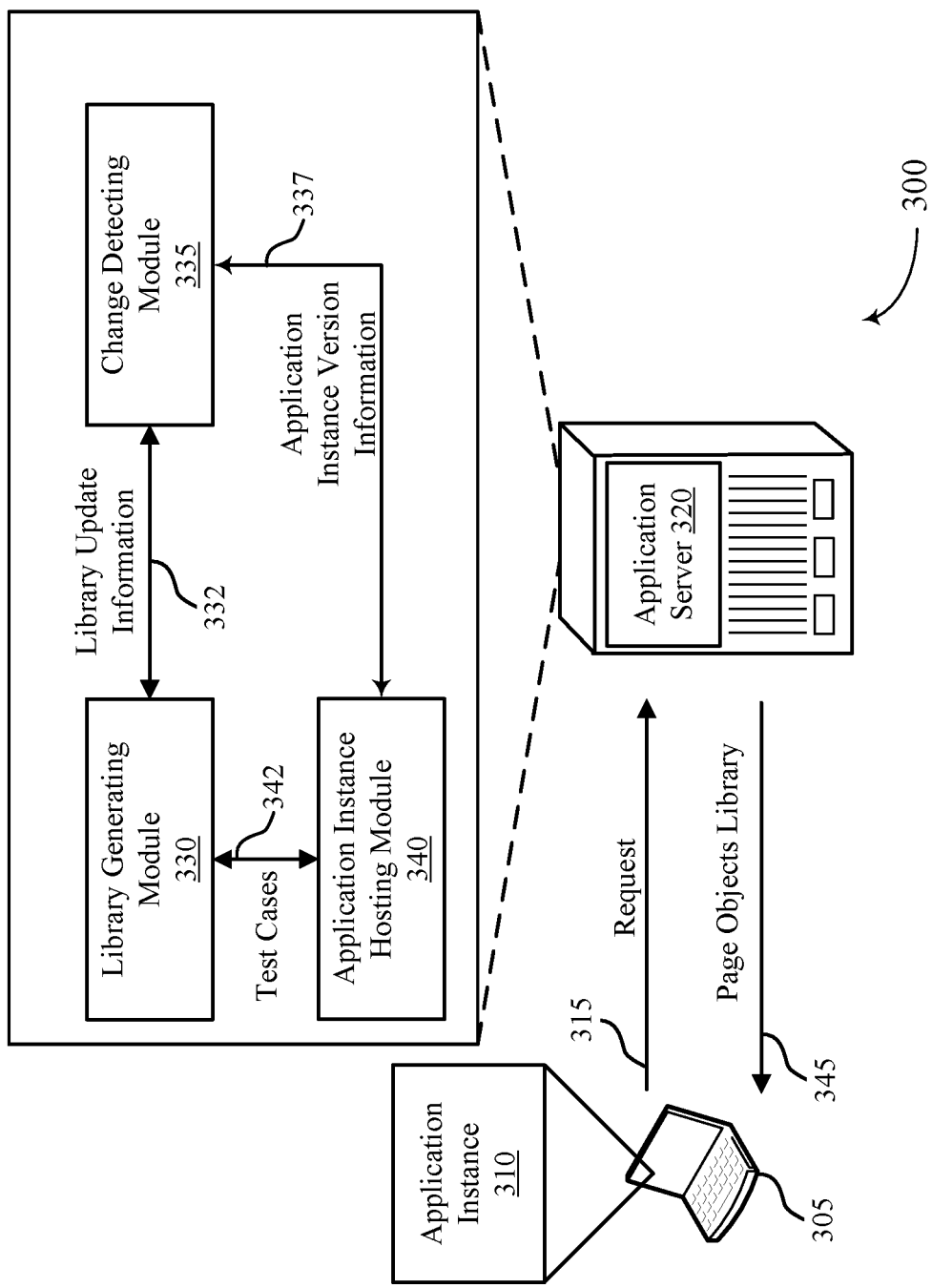
FIG. 3 illustrates an example of a page objects library generation that supports a page objects library in accordance with aspects of the present disclosure.

FIG. 3 illustrates an example of a page objects library generation 300 that supports a page objects library in accordance with aspects of the present disclosure. The page objects library generation 300 may include a user device 305, which may be an example of a cloud client 105 or a contact 110 as described with reference to FIG. 1, or a user device 205 as described with reference to FIG. 2. An administrative user may operate the user device 305 running an instance of an application (e.g., the application instance 310) which is hosted by an application server 320. In some cases, the user device 305 may run an application builder which builds the application instance 310 or an application functionality testing program. Using the user device 305, the administrative user or another developer may create the application including one or more pages and components. The administrative user may use some default components to create the application or use their own custom components.

As described herein, changes to the application (e.g., front-end changes or back-end changes) may disrupt application functionality tests. To improve robustness and enforce high quality coding practices for the application and testing procedures, the application server 320 may provide a page objects library to the user device 305. The page objects library may provide modules that are agnostic to or unaffected by application UI changes. Tests generated based on the page objects library may work correctly even after changes are made to the application. The administrative user for the user device 305, or other developers, may use the page objects library when creating automated tests for the application 310, when designing the application 310 or components of the application 310, or when creating or modifying a page object or elements of the page object for the application 310.

The page objects library may be shared with customers and tenants of the application server 320. For example, the page objects library may be shared with the user device 305. The user device 305 may send a request 315 to the application server 320 for the page objects library. The application server 320 may provide the page objects library to the user device 205 in a response 345.

The application server may include a library generating module 330, a change detecting module 335, and an application instance hosting module 340. The library generating module 330 may generate the library of classes (e.g., the page objects library). The library generating module 330 create the different classes and framework for the page objects library.

The change detecting module 335 may identify changes to the application 310. For example, the change detecting module 335 may detect backend changes made to the application. The backend changes may include on functionality or UI changes to the application 310. In some cases, the backend changes may be based on change request received from cloud clients such as the user device 305. In some cases, the change detecting module 335 may identify front-end changes for the application instance 310. In some cases, the user device 305 may report front-end changes made by a developer or an administrative user to the application instance 310. For example, the application instance 310 may use custom functionality such as a custom class or custom component.

The application instance hosting module 340 may host the application instance 310. For example, the user device 305 may navigate to a URL or web page which is hosted by the application server 320 using the application instance hosting module 340.

In some cases, the library generating module 330 and the change detecting module 335 may exchange library update information 332. For example, the change detecting module 335 may identify a change made to the application instance 310, and the library generating module 330 may generate the library based on the detected change and the library update information 332. In some cases, the change detecting module 335 and the application instance hosting module 340 may exchange software platform instance version information 337. For example, the application instance version information may indicate a version of a software platform which is running the application instance 310. In some cases, very old or legacy software platforms may be used to run an application. However, even these very old or legacy versions of the software platform may use the page objects library or be updated to use the page objects library. The application instance information may be used to integrate the page objects library into existing frameworks at the user device 305.

In some examples, the library generating module 330 and the application instance hosting module 340 may exchange test case information 342. For example, the information to be provided to the user device 305 may be based on characteristics of the user device 305 and the software environment at the user device 305. In some cases, the page objects library may be generated based on the application instance at the user device 305. Additionally, or alternatively, a server-side application instance may be used to test the page objects library before distributing the page objects library to cloud clients such as the user device 305.

Figure 4:
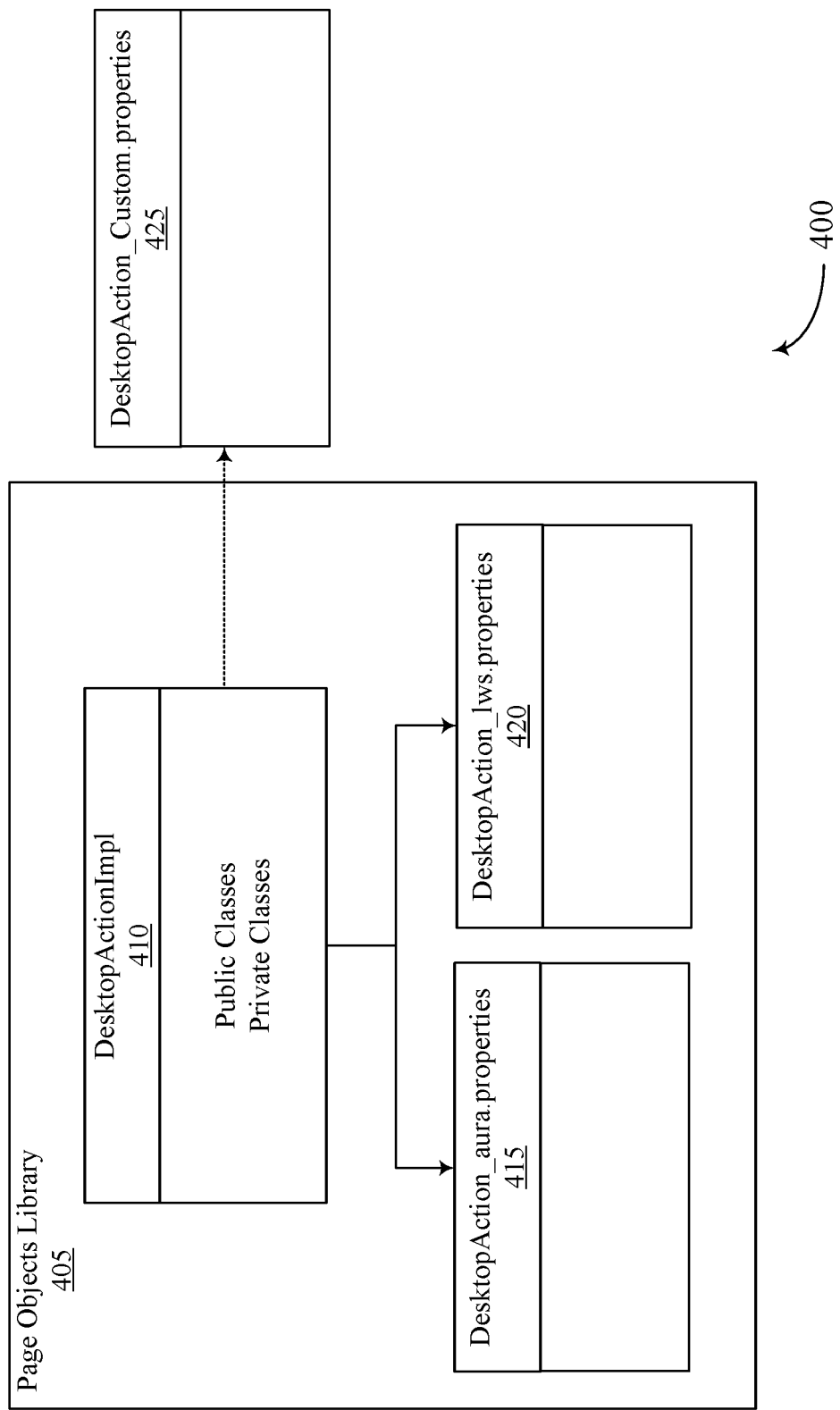
FIG. 4 illustrates an example of a multiple property file configuration that supports a page objects library in accordance with aspects of the present disclosure.

FIG. 4 illustrates an example of a multiple property file configuration 400 that supports a page objects library in accordance with aspects of the present disclosure.

As described in FIG. 2, an application server may provide a page objects library to a user device, which may be an example of a cloud client or a contact as described in FIG. 1. Classes in the page objects library may be configured to support multiple property files. For example, each property file may be associated with a relative locator specific to the implementation of the property file.

For example, the page objects library 405 may include a page object 410. The page object 410 may be, for example, a DesktopAction page object. The page object 410 may include public classes and private classes. The page objects library 405 may provide two implementations for the page object 410 for different JavaScript frameworks (etc., aura and lwc). These two implementations may correspond to a first properties file 415 and a second properties file 420. Functionally, these components may provide the same features but use different locators. The page objects library 405 may store locators in properties files such that different versions of a component may use the same class. Thus, page object 410 may include multiple property files for the multiple different versions of the page object 410.

In some cases, a tenant of the application server may create a custom implementation for the page object, and the custom implementation may use a third properties file 425. Thus, the tenant may easily customize the page object for their own uses and organization.

Figure 5:
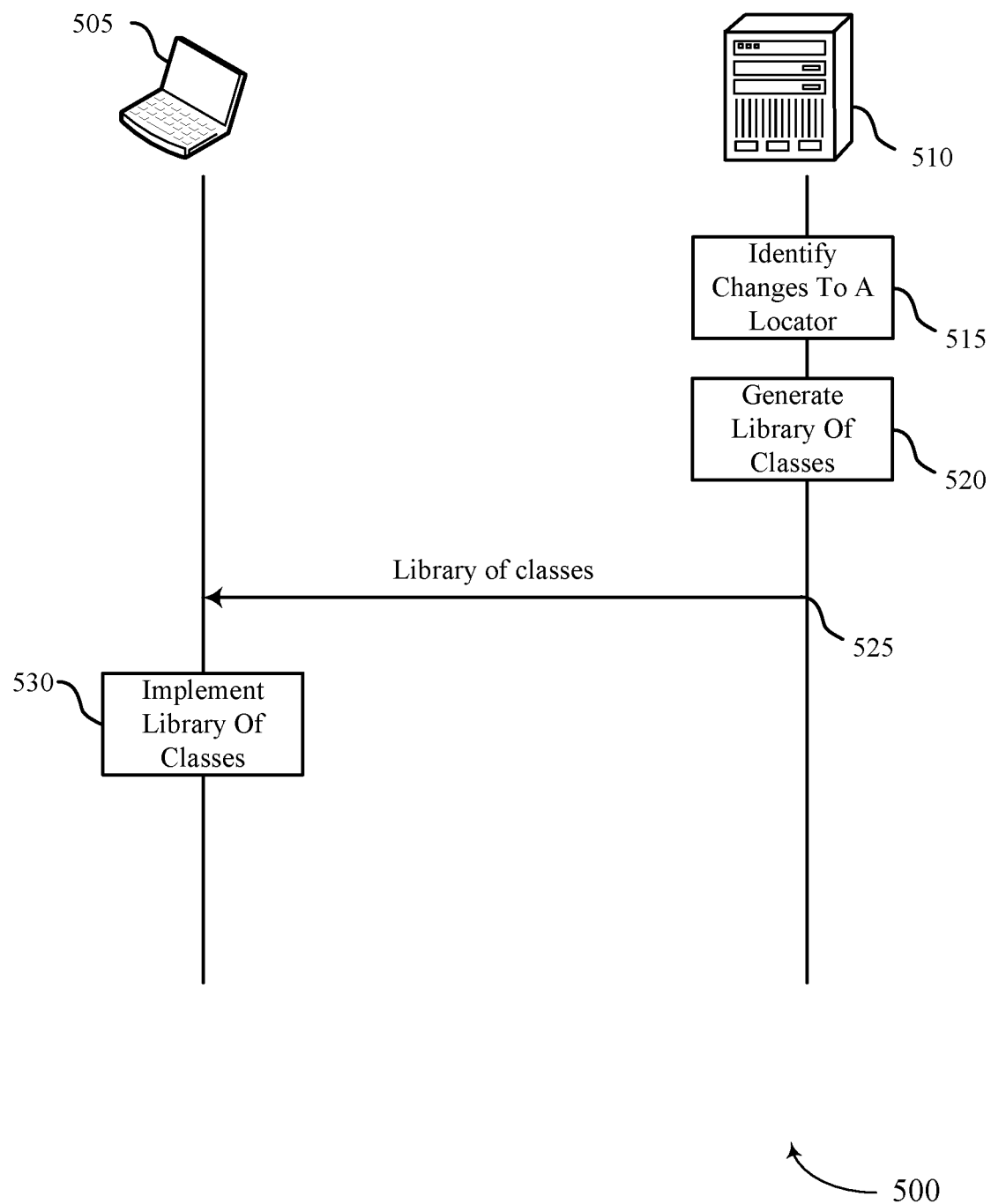
FIG. 5 illustrates an example of a process flow that supports a page objects library in accordance with aspects of the present disclosure.

FIG. 5 illustrates an example of a process flow 500 that supports a page objects library in accordance with aspects of the present disclosure.

The process flow 500 may include a user device 505, which may be an example of a cloud client 105 or a contact 110 as described with reference to FIG. 1, or a user device as described with reference to FIGS. 2 and 3. An administrative user may operate the user device 505 running an instance of an application which is hosted by an application server 510.

At 515, the application server 510 may identify a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform. For example, the application server 510 may detect a front-end or a back-end change to an application instance, or a component of the application instance, which is customized for the user device 505. The change may affect the performance of an automated test which is performed at the user device 505. For example, the change may break a hardcoded locator used to identify components of the application as described herein.

At 520, the application server 510 may generate, based on the change to the locator, a library of classes that support relative locators, where the locator for the component of the page is reconfigured as a relative locator for the component of the page based on the library of classes, the relative locator configured with respect to a container component for the component and a page object for the page. For example, the application server 510 may generate the page objects library as described herein. The page objects library may support reusable components which are agnostic to or unaffected by changes to the application. The page objects library may also include a page objects API such that the page objects library can be implemented at the user device 505.

At 525, the application server 510 may provide the page objects library to the user device 505. The page objects library may be provided as a JAR file, or via a shared code repository.

At 530, the user device 505 may redesign the application or reconstruct the automated page functionality tests based on the page objects library. In some cases, the page objects library may be integrated with the existing framework at the user device 505. Once the page objects library is implemented, the application instance at the user device 505 may be robust to additional changes to the application.

Figure 6:
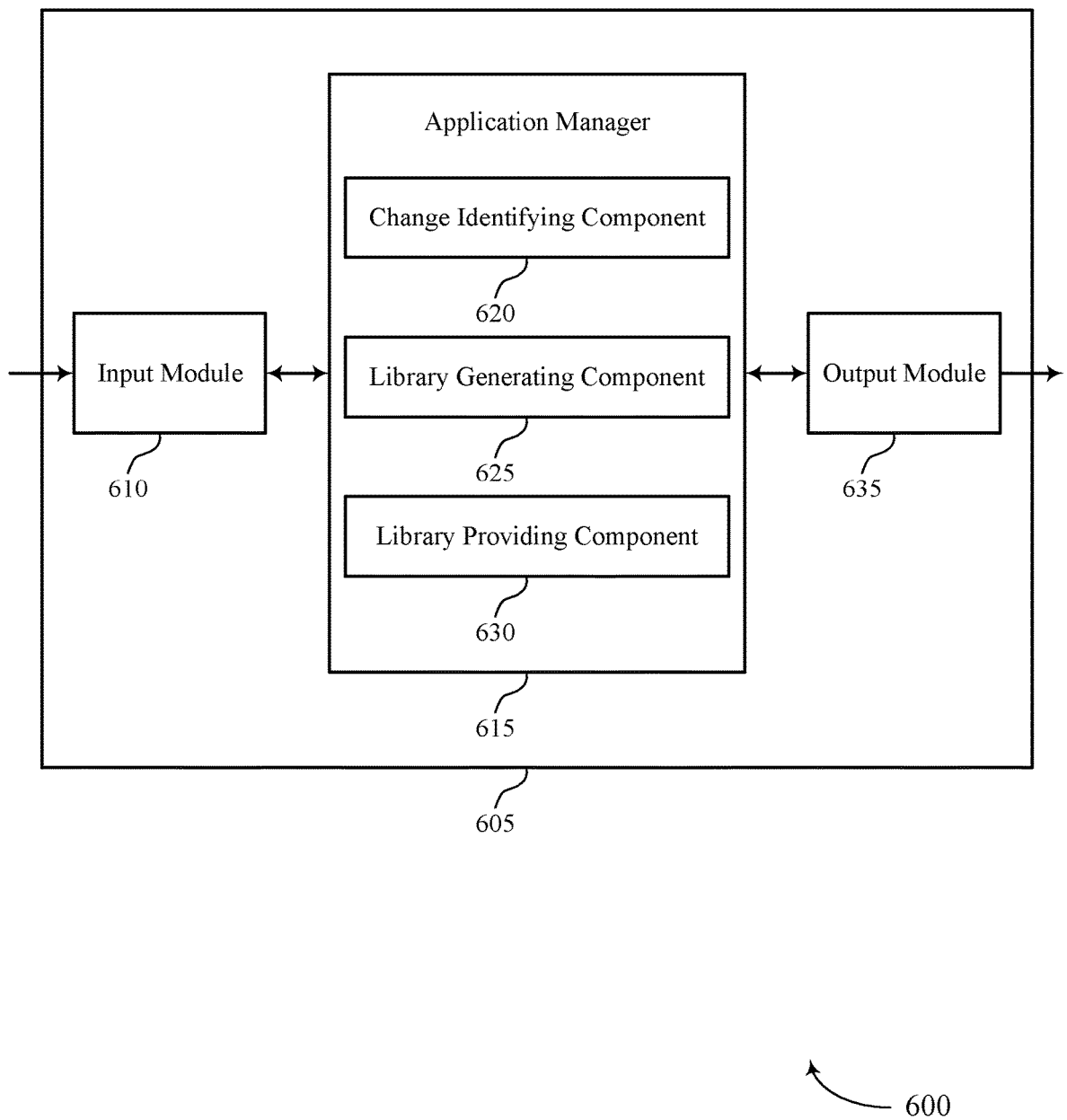
FIG. 6 shows a block diagram of an apparatus that supports a page objects library in accordance with aspects of the present disclosure.

FIG. 6 shows a block diagram 600 of an apparatus 605 that supports a page objects library in accordance with aspects of the present disclosure. The apparatus 605 may include an input module 610, an application manager 615, and an output module 635. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to a data retention module to support data retention handling for data object stores. In some cases, the input module 610 may be a component of an input/output (I/O) controller 815 as described with reference to FIG. 8.

The application manager 615 may include a change identifying component 620, a library generating component 625, and a library providing component 630. The application manager 615 may be an example of aspects of the application manager 705 or 810 described with reference to FIGS. 7 and 8.

The application manager 615 and/or at least some of its various sub-components may be implemented in hardware, software executed by a processor, firmware, or any combination thereof. If implemented in software executed by a processor, the functions of the application manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The application manager 615 and/or at least some of its various sub-components may be physically located at various positions, including being distributed such that portions of functions are implemented at different physical locations by one or more physical devices. In some examples, the application manager 615 and/or at least some of its various sub-components may be a separate and distinct component in accordance with various aspects of the present disclosure. In other examples, the application manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The change identifying component 620 may identify a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform. The library generating component 625 may generate, based on the change to the locator, a library of classes that support relative locators, where the locator for the component of the page is reconfigured as a relative locator for the component of the page based on the library of classes, the relative locator configured with respect to a container component for the component and a page object for the page. The library providing component 630 may provide the library of classes to the tenant of the cloud-based software platform.

The output module 635 may manage output signals for the apparatus 605. For example, the output module 635 may receive signals from other components of the apparatus 605, such as the data retention module, and may transmit these signals to other components or devices. In some specific examples, the output module 635 may transmit output signals for display in a user interface, for storage in a database or data store, for further processing at a server or server cluster, or for any other processes at any number of devices or systems. In some cases, the output module 635 may be a component of an I/O controller 815 as described with reference to FIG. 8.

Figure 7:
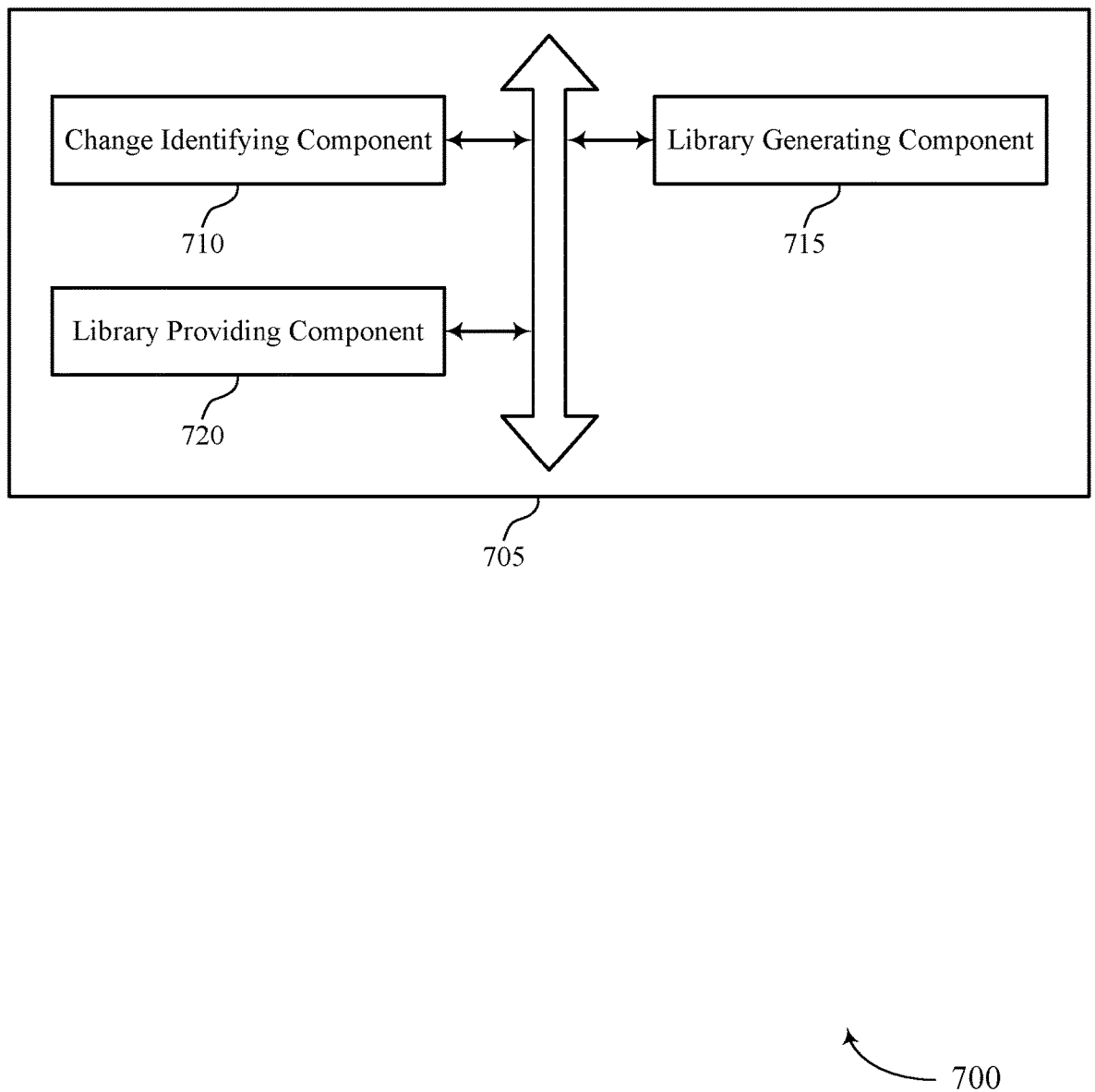
FIG. 7 shows a block diagram of an application manager that supports a page objects library in accordance with aspects of the present disclosure.

FIG. 7 shows a block diagram 700 of an application manager 705 that supports a page objects library in accordance with aspects of the present disclosure. The application manager 705 may be an example of aspects of an application manager 615 or an application manager 810 described herein. The application manager 705 may include a change identifying component 710, a library generating component 715, and a library providing component 720. Each of these modules may communicate, directly or indirectly, with one another (e.g., via one or more buses).

The change identifying component 710 may identify a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform.

In some examples, the change identifying component 710 may identify additional changes to the instance of the software platform that cause further failure to the automated page functionality test. In some cases, the relative locator is configured to identify the component based on a parent component and a root of the page object.

In some cases, the component is identified by the relative locator relative to the parent component based on a hierarchy of components for the page starting from the root of the page object. In some cases, the component is one of a set of components of the page, and each component of the set of components of the page is configured to be located based on the relative locator and a corresponding index.

In some cases, the change to the locator for the component includes one or more of a relabeling for a text identifier of the component, an insertion or deletion of a neighboring component of the page, a modification to a class of the component, or a modification to the page object. In some cases, the one or more actions using the locator for the automated page functionality test include clicking on the component, entering a text field into the component, or selecting a value for the component. In some cases, the page object is generated based on an XML file including a list of fields for components, types, or indices, or any combination thereof.

The library generating component 715 may generate, based on the change to the locator, a library of classes that support relative locators, where the locator for the component of the page is reconfigured as a relative locator for the component of the page based on the library of classes, the relative locator configured with respect to a container component for the component and a page object for the page.

In some examples, the library generating component 715 may generate a revised library of classes based on the additional changes to the instance of the software platform. In some cases, the page object includes a set of property files associated with the component of the page, and where a property file of the set of property files is associated with the relative locator for the component of the page based on a use context of the component within the page object for the page. In some cases, the library of classes includes a class of the component, and the class of the component is supported to be used across a set of page objects based on the relative locator.

In some cases, the relative locator is configured to be replaced with a direct locator to the component of the page upon execution of the automated page functionality test.

In some cases, an interaction with the component is suppressed until the component can support dynamic rendering on the page. In some cases, the relative locator is configured to locate the component within a shadow DOM based on a parameter of the relative locator. In some cases, the library of classes restricts a type of locator for the relative locator to a CSS selector to mimic application classes and prevent duplicate locators across a set of pages.

The library providing component 720 may provide the library of classes to the tenant of the cloud-based software platform. In some examples, the library providing component 720 may provide the revised library of classes to the tenant of the cloud-based software platform. In some cases, the library of classes is provided to the tenant of the cloud-based software platform in a JAR file, via a shared code repository, or both.

Figure 8:
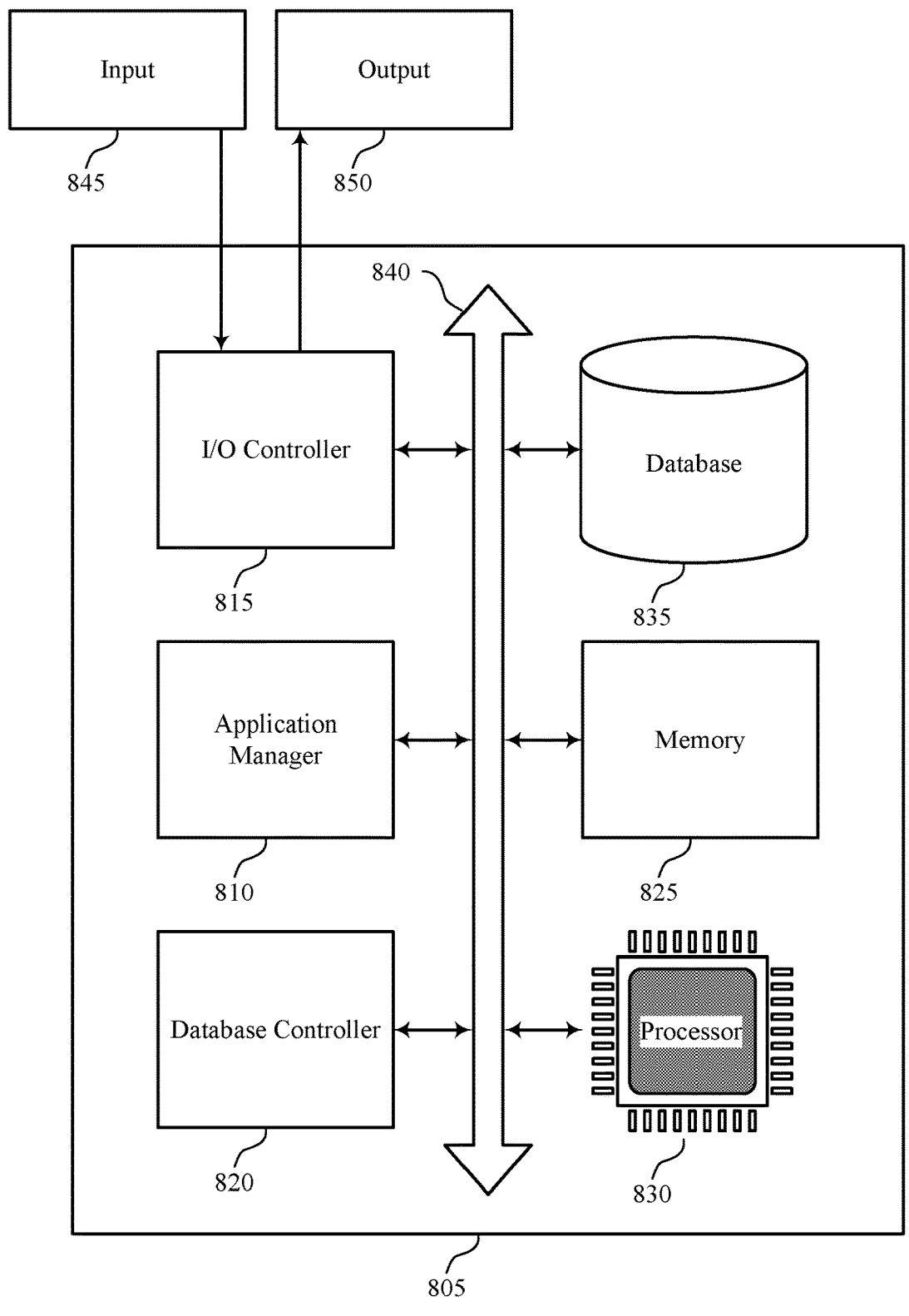
FIG. 8 shows a diagram of a system including a device that supports a page objects library in accordance with aspects of the present disclosure.

FIG. 8 shows a diagram of a system 800 including a device 805 that supports a page objects library in accordance with aspects of the present disclosure. The device 805 may be an example of or include the components of an application server or an apparatus 605 as described herein. The device 805 may include components for bi-directional data communications including components for transmitting and receiving communications, including an application manager 810, an I/O controller 815, a database controller 820, memory 825, a processor 830, and a database 835. These components may be in electronic communication via one or more buses (e.g., bus 840).

The application manager 810 may be an example of an application manager 615 or 705 as described herein. For example, the application manager 810 may perform any of the methods or processes described above with reference to FIGS. 6 and 7. In some cases, the application manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting a page objects library).

Figure 9:
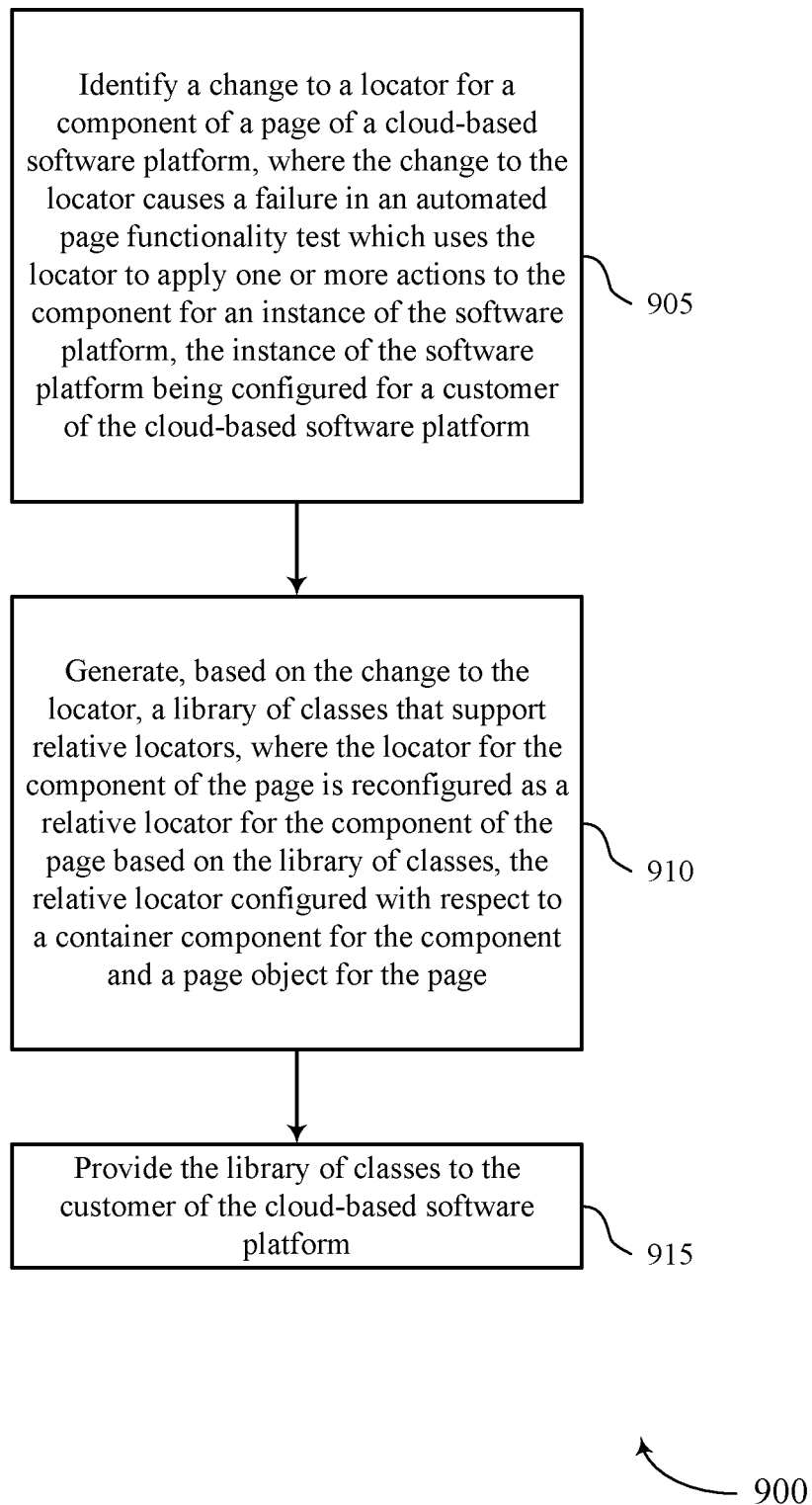
FIGS. 9 and 10 show flowcharts illustrating methods that support a page objects library in accordance with aspects of the present disclosure.

FIG. 9 shows a flowchart illustrating a method 900 that supports a page objects library in accordance with aspects of the present disclosure. The operations of method 900 may be implemented by an application server or its components as described herein. For example, the operations of method 900 may be performed by an application manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may identify a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform. The operations of 905 may be performed according to the methods described herein. In some examples, aspects of the operations of 905 may be performed by a change identifying component as described with reference to FIGS. 6 through 8.

At 910, the application server may generate, based on the change to the locator, a library of classes that support relative locators, where the locator for the component of the page is reconfigured as a relative locator for the component of the page based on the library of classes, the relative locator configured with respect to a container component for the component and a page object for the page. The operations of 910 may be performed according to the methods described herein. In some examples, aspects of the operations of 910 may be performed by a library generating component as described with reference to FIGS. 6 through 8.

At 915, the application server may provide the library of classes to the tenant of the cloud-based software platform. The operations of 915 may be performed according to the methods described herein. In some examples, aspects of the operations of 915 may be performed by a library providing component as described with reference to FIGS. 6 through 8.

Figure 10:
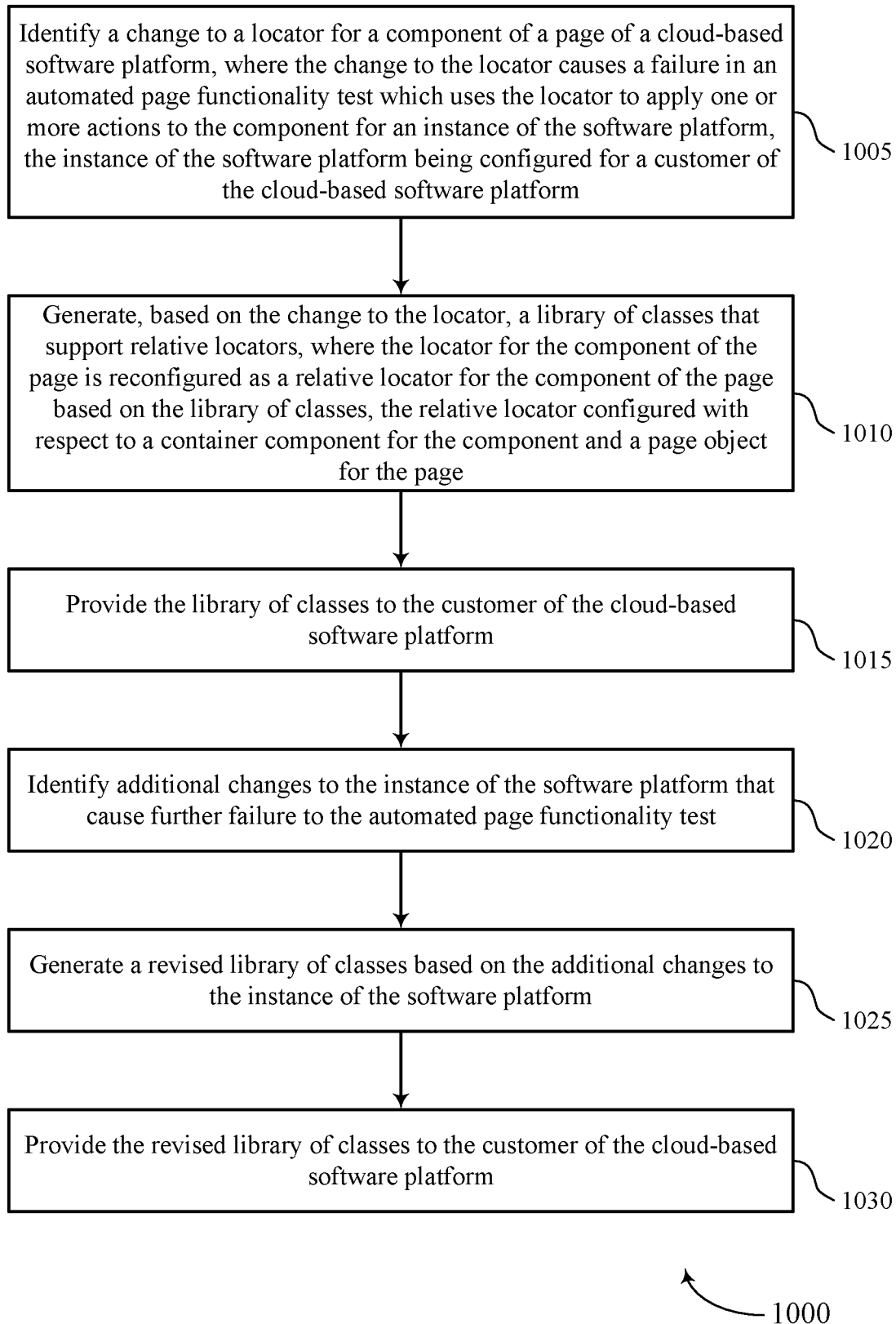

FIG. 10 shows a flowchart illustrating a method 1000 that supports a page objects library in accordance with aspects of the present disclosure. The operations of method 1000 may be implemented by an application server or its components as described herein. For example, the operations of method 1000 may be performed by an application manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may identify a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform. The operations of 1005 may be performed according to the methods described herein. In some examples, aspects of the operations of 1005 may be performed by a change identifying component as described with reference to FIGS. 6 through 8.

At 1010, the application server may generate, based on the change to the locator, a library of classes that support relative locators, where the locator for the component of the page is reconfigured as a relative locator for the component of the page based on the library of classes, the relative locator configured with respect to a container component for the component and a page object for the page. The operations of 1010 may be performed according to the methods described herein. In some examples, aspects of the operations of 1010 may be performed by a library generating component as described with reference to FIGS. 6 through 8.

At 1015, the application server may provide the library of classes to the tenant of the cloud-based software platform. The operations of 1015 may be performed according to the methods described herein. In some examples, aspects of the operations of 1015 may be performed by a library providing component as described with reference to FIGS. 6 through 8.

At 1020, the application server may identify additional changes to the instance of the software platform that cause further failure to the automated page functionality test. The operations of 1020 may be performed according to the methods described herein. In some examples, aspects of the operations of 1020 may be performed by a change identifying component as described with reference to FIGS. 6 through 8.

At 1025, the application server may generate a revised library of classes based on the additional changes to the instance of the software platform. The operations of 1025 may be performed according to the methods described herein. In some examples, aspects of the operations of 1025 may be performed by a library generating component as described with reference to FIGS. 6 through 8.

At 1030, the application server may provide the revised library of classes to the tenant of the cloud-based software platform. The operations of 1030 may be performed according to the methods described herein. In some examples, aspects of the operations of 1030 may be performed by a library providing component as described with reference to FIGS. 6 through 8.

A method of maintaining automated tests is described. The method may include identifying a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform, generating, based on the change to the locator, a library of classes that support relative locators, where the locator for the component of the page is reconfigured as a relative locator for the component of the page based on the library of classes, the relative locator configured with respect to a container component for the component and a page object for the page, and providing the library of classes to the tenant of the cloud-based software platform.

An apparatus for maintaining automated tests is described. The apparatus may include a processor, memory in electronic communication with the processor, and instructions stored in the memory. The instructions may be executable by the processor to cause the apparatus to identify a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform, generate, based on the change to the locator, a library of classes that support relative locators, where the locator for the component of the page is reconfigured as a relative locator for the component of the page based on the library of classes, the relative locator configured with respect to a container component for the component and a page object for the page, and provide the library of classes to the tenant of the cloud-based software platform.

Another apparatus for maintaining automated tests is described. The apparatus may include means for identifying a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform, generating, based on the change to the locator, a library of classes that support relative locators, where the locator for the component of the page is reconfigured as a relative locator for the component of the page based on the library of classes, the relative locator configured with respect to a container component for the component and a page object for the page, and providing the library of classes to the tenant of the cloud-based software platform.

A non-transitory computer-readable medium storing code for maintaining automated tests is described. The code may include instructions executable by a processor to identify a change to a locator for a component of a page of a cloud-based software platform, where the change to the locator causes a failure in an automated page functionality test which uses the locator to apply one or more actions to the component for an instance of the software platform, the instance of the software platform being configured for a tenant of the cloud-based software platform, generate, based on the change to the locator, a library of classes that support relative locators, where the locator for the component of the page is reconfigured as a relative locator for the component of the page based on the library of classes, the relative locator configured with respect to a container component for the component and a page object for the page, and provide the library of classes to the tenant of the cloud-based software platform.

Some examples of the method, apparatuses, and non-transitory computer-readable medium described herein may further include operations, features, means, or instructions for identifying additional changes to the instance of the software platform that cause further failure to the automated page functionality test, generating a revised library of classes based on the additional changes to the instance of the software platform, and providing the revised library of classes to the tenant of the cloud-based software platform.

In some examples of the method, apparatuses, and non-transitory computer-readable medium described herein, the relative locator may be configured to identify the component based on a parent component and a root of the page object.

In some examples of the method, apparatuses, and non-transitory computer-readable medium described herein, the component may be identified by the relative locator relative to the parent component based on a hierarchy of components for the page starting from the root of the page object.

In some examples of the method, apparatuses, and non-transitory computer-readable medium described herein, the page object includes a set of property files associated with the component of the page, and where a property file of the set of property files may be associated with the relative locator for the component of the page based on a use context of the component within the page object for the page.

In some examples of the method, apparatuses, and non-transitory computer-readable medium described herein, the component may be one of a set of components of the page, and each component of the set of components of the page may be configured to be located based on the relative locator and a corresponding index.

In some examples of the method, apparatuses, and non-transitory computer-readable medium described herein, the library of classes includes a class of the component, and the class of the component may be supported to be used across a set of page objects based on the relative locator.

In some examples of the method, apparatuses, and non-transitory computer-readable medium described herein, the relative locator may be configured to be replaced with a direct locator to the component of the page upon execution of the automated page functionality test.

In some examples of the method, apparatuses, and non-transitory computer-readable medium described herein, the library of classes may be provided to the tenant of the cloud-based software platform in a java archive (JAR) file, via a shared code repository, or both.

In some examples of the method, apparatuses, and non-transitory computer-readable medium described herein, the change to the locator for the component includes one or more of a relabeling for a text identifier of the component, an insertion or deletion of a neighboring component of the page, a modification to a class of the component, or a modification to the page object.

In some examples of the method, apparatuses, and non-transitory computer-readable medium described herein, the one or more actions using the locator for the automated page functionality test include clicking on the component, entering a text field into the component, or selecting a value for the component.

In some examples of the method, apparatuses, and non-transitory computer-readable medium described herein, an interaction with the component may be suppressed until the component can support dynamic rendering on the page.

In some examples of the method, apparatuses, and non-transitory computer-readable medium described herein, the relative locator may be configured to locate the component within a shadow document object model (DOM) based on a parameter of the relative locator.

In some examples of the method, apparatuses, and non-transitory computer-readable medium described herein, the page object may be generated based on an extensible markup language (XML) file including a list of fields for components, types, or indices, or any combination thereof.

In some examples of the method, apparatuses, and non-transitory computer-readable medium described herein, the library of classes restricts a type of locator for the relative locator to a cascading style sheet (CSS) selector to mimic application classes and prevent duplicate locators across a set of pages.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for maintaining automated tests, comprising:
executing an automated page functionality test configured to check a functionality of an instance of a cloud-based software platform, the instance comprising at least one page of an application and one or more user interface components included in the at least one page, wherein the automated page functionality test uses a static locator to locate a component in the page, and applies one or more actions to interact with the component expecting the component to produce a first outcome, the instance being configured for a tenant of the cloud-based software platform;
identifying that a change to the static locator for the component would cause a failure of the automated page functionality test, wherein the application of the one or more actions to the component fails to result in the first outcome;
reconfiguring, based at least in part on the change to the static locator, the static locator for the component to a relative locator for the component with respect to one or more container components for the component, wherein the relative locator is configured to locate the component within the page based at least in part on starting from a root element of the page and traversing a hierarchy of components within a parent component until the relative locator locates the component in the page;
generating a library of classes for a plurality of page objects that points to relative locators, wherein the relative locator is configured with respect to a page object of the plurality of page objects; and
providing the library of classes to the tenant of the cloud-based software platform.

2. The method of claim 1, further comprising:
identifying additional changes to the instance of the software platform that cause further failure to the automated page functionality test;
generating a revised library of classes based at least in part on the additional changes to the instance of the software platform; and
providing the revised library of classes to the tenant of the cloud-based software platform.

3. The method of claim 1, wherein the relative locator is configured to identify the component based at least in part on the parent component and the root element of the page object.

4. The method of claim 3, wherein the component is identified by the relative locator relative to the parent component based at least in part on the hierarchy of components for the page starting from the root of the page object.

5. The method of claim 1, wherein the page object comprises a plurality of property files associated with the component of the page, and wherein a property file of the plurality of property files is associated with the relative locator for the component of the page based at least in part on a use context of the component within the page object for the page.

6. The method of claim 1, wherein the component is one of a plurality of components of the page, and each component of the plurality of components of the page is configured to be located based at least in part on the relative locator and a corresponding index.

7. The method of claim 1, wherein the library of classes comprises a class of the component, and the class of the component is supported to be used across the plurality of page objects based at least in part on the relative locator.

8. The method of claim 1, wherein the relative locator is configured to be replaced with a direct locator to the component of the page upon execution of the automated page functionality test.

9. The method of claim 1, wherein the library of classes is provided to the tenant of the cloud-based software platform in a java archive (JAR) file, via a shared code repository, or both.

10. The method of claim 1, wherein the change to the static locator for the component comprises one or more of a relabeling for a text identifier of the component, an insertion or deletion of a neighboring component of the page, a modification to a class of the component, or a modification to the page object.

11. The method of claim 1, wherein the one or more actions using the static locator for the automated page functionality test comprise clicking on the component, entering a text field into the component, or selecting a value for the component.

12. The method of claim 1, wherein an interaction with the component is suppressed until the component can support dynamic rendering on the page.

13. The method of claim 1, wherein the relative locator is configured to locate the component within a shadow document object model (DOM) based at least in part on a parameter of the relative locator.

14. The method of claim 1, wherein the page object is generated based at least in part on an extensible markup language (XML) file comprising a list of fields for components, types, or indices, or any combination thereof.

15. The method of claim 1, wherein the library of classes restricts a type of locator for the relative locator to a cascading style sheet (CSS) selector to mimic application classes and prevent duplicate locators across a plurality of pages.

16. An apparatus for maintaining automated tests, comprising:
a processor,
memory in electronic communication with the processor; and
instructions stored in the memory and executable by the processor to cause the apparatus to:
execute an automated page functionality test configured to check a functionality of an instance of a cloud-based software platform, the instance comprising at least one page of an application and one or more user interface components included in the at least one page, wherein the automated page functionality test uses a static locator to locate a component in the page, and applies one or more actions to interact with the component expecting the component to produce a first outcome, the instance being configured for a tenant of the cloud-based software platform;
identify that a change to the static locator for the component would cause a failure of the automated page functionality test, wherein the application of the one or more actions to the component fails to result in the first outcome;
reconfigure, based at least in part on the change to the static locator, the static locator for the component to a relative locator for the component with respect to one or more container components for the component, wherein the relative locator is configured to locate the component within the page based at least in part on starting from a root element of the page and traversing a hierarchy of components within a parent component until the relative locator locates the component in the page;

generate a library of classes for a plurality of page objects that points to relative locators, wherein the relative locator is configured with respect to a page object of the plurality of page objects; and provide the library of classes to the tenant of the cloud-based software platform.

17. The apparatus of claim 16, wherein the relative locator is configured to identify the component based at least in part on the parent component and the root element of the page object.

18. The apparatus of claim 16, wherein the page object comprises a plurality of property files associated with the component of the page, and wherein a property file of the plurality of property files is associated with the relative locator for the component of the page based at least in part on a use context of the component within the page object for the page.

19. The apparatus of claim 16, wherein the component is one of a plurality of components of the page, and each component of the plurality of components of the page is configured to be located based at least in part on the relative locator and a corresponding index.

20. A non-transitory computer-readable medium storing code for maintaining automated tests, the code comprising instructions executable by a processor to:

execute an automated page functionality test configured to check a functionality of an instance of a cloud-based software platform, the instance comprising at least one page of an application and one or more user interface components included in the at least one page, wherein the automated page functionality test uses a static locator to locate a component in the page, and applies one or more actions to interact with the component expecting the component to produce a first outcome, the instance being configured for a tenant of the cloud-based software platform;

identify that a change to the static locator for the component would cause a failure of the automated page functionality test, wherein the application of the one or more actions to the component fails to result in the first outcome;

reconfigure, based at least in part on the change to the static locator, the static locator for the component to a relative locator for the component with respect to one or more container components for the component, wherein the relative locator is configured to locate the component within the page based at least in part on starting from a root element of the page and traversing a hierarchy of components within a parent component until the relative locator locates the component in the page;

generate a library of classes for a plurality of page objects that points to relative locators, wherein the relative locator is configured with respect to a page object of the plurality of page objects; and provide the library of classes to the tenant of the cloud-based software platform.

* * * * *